Nov. 11, 1969   E. D. O'CONNELL ETAL   3,477,163
FISHING GAFF
Filed Jan. 16, 1967

INVENTORS
EDWARD D. O'CONNELL
KATHRYN M. O'CONNELL

United States Patent Office 3,477,163
Patented Nov. 11, 1969

3,477,163
FISHING GAFF
Edward D. O'Connell and Kathryn M. O'Connell, both of 6109 Castor Ave., Philadelphia, Pa. 19149
Filed Jan. 16, 1967, Ser. No. 609,695
Int. Cl. A01k 97/14
U.S. Cl. 43—5           1 Claim

ABSTRACT OF THE DISCLOSURE

A fishing gaff has a circular frame provided with a plurality of pivotally connected, spring-loaded blade members. Flexible cables are releasably connected at one end to spaced points on the frame and have their other ends releasably connected together to provide a fishing line centering guide. Each of the blades have arcuate, bifurcated pointed free ends.

---

Our invention relates to a device suspended from a rope, for gaffing and lifting from the water to an elevated surface, a fish whose body is partly in water and partially suspended in air from a hook fastened to a fishing line; such as a fish landed from a boat, pier, bridge, bank jetty or stream without the risk of losing the fish due to an overloaded line or tackle.

An object of our invention is a gaff so designed as to enable every fisherman to have a gaff and land his own fish, without assistance, which will greately enhance his pleasure in fishing, as our gaff is designed to be readily engaged with a fishing line which guides the gaff downward and over the hooked fish and securely engages the fish when the gaff is pulled upward, the blades piercing the fish, and when the fish has been landed it can be quickly disengaged by pulling it forward thru the gaff as its supporting cables are flexible.

An object of our invention is the compactness of the gaff, its light weight and simplicity of its design, construction and use, also the storage and transportation of the gaff which can be carried in a standard fishing tackle box and still handle small and large fish.

Another object of our invention is the design of a gaff which will permit a large fish to be gaffed, towed and hoisted to a landing place without additional tackle.

Other objects of our invention are the replacement of pole gaffs and the pole type flying gaffs currently in use and employed on pleasure, party and sport fishing boats, as their use can be very dangerous and usually require a second person to obtain the gaff and complete the landing of the fish. Also to replace the pole type net which is used for landing fish from a small boat, as they are unwieldly to handle, require considerable space in the boat and are usually tangled with some other gear, and to replace the large diameter ring type net which is suspended on a rope and used to net a fish which has been hooked, and to hoist it to an elevated surface such as a pier, bridge or similar landing place.

In the achievement of these objectives, there is provided in accordance with our invention an apparatus for lifting a fish from the water when it is too heavy for the fishing line used. Further objects of our invention and advantages thereof will become apparent from the following description taken in conjunction with the accompanying drawing.

Figure 1:
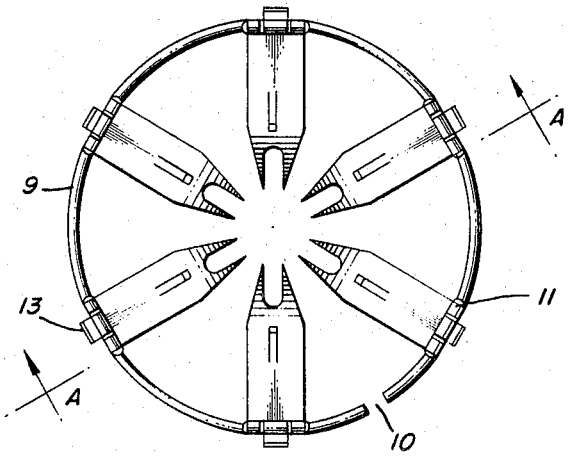

FIG. 1 is a plan view of a partially assembled embodiment of our invention with the double pointed blades shown in the closed position and the flexible lifting cables omitted for clarity purposes.

Figure 2:
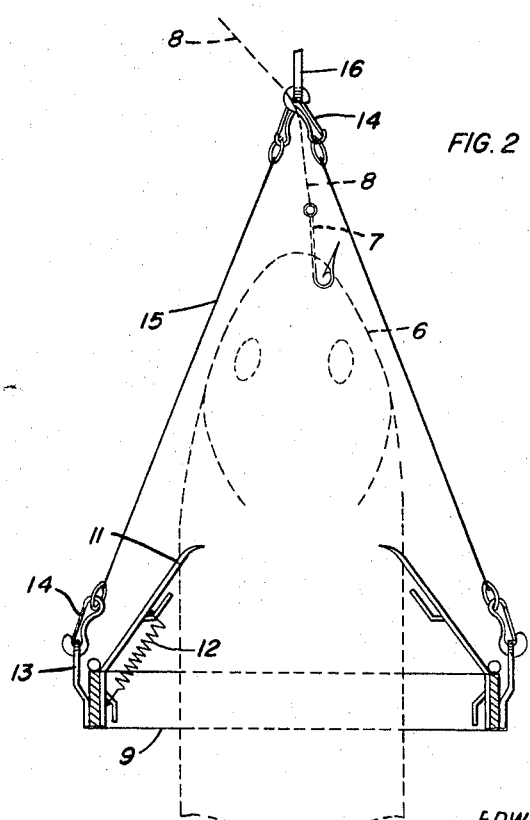

FIG. 2 is a fragmentary sectional view taken on line "A—A" of FIG. 1 and showing the pointed blades engaging a fish which is suspended from a hook and impaled by two of a plurality of blades, only two pointed blades and two lifting cables are shown for clarity purposes in the section. Referring now to the drawing FIG. 1, the apparatus comprises a split metal ring frame 9 and opening 10. A plurality of hinge type double pointed blades 11 are permanently secured to frame 9 by suitable means. The pointed ends of the blade 11 are curved slightly downward to better engage and pierce the fish 6 when the gaff is lifted. In use, the fishing line is threaded thru the opening 10 in frame 9, and by inserting the line 8 into the snap 14 it centers the gaff while it is being lowered over the hooked fish's head; the blades 11 swinging upwardly upon engagement with the fish as shown in FIG. 2. Tension springs 12 are suitably attached to blades 11 to provide a light tension downwardly on the blades 11 to insure a positive piercing action by the blade points. Clips 13 are permanently secured to frame 9 for attaching snaps 14. Flexible lifting cables 15 have snaps 14 and ring 16 attached thereto.

What we claim as our invention is:
1. A fishing gaff for use with a fishing line on which a fish has been hooked comprising a circular frame member having an opening therein for receiving the fishing line, a plurality of flat blade members pivotally connected at one end to said frame member at equally spaced positions thereon, each of said blade members being provided with a pair of arcuate pointed free ends, a tension spring connected to each of said blade members at one end and to said frame member at its other end for yieldably biasing said blade members into a plane substantially normal to the central axis of said frame member, a plurality of flexible cable members connected at one end to said frame member in spaced relation by snap fasteners and a central snap fastener connecting the other ends of said cable members, said central snap fastener having a looped portion positioned to releasably receive and guide said fishing line.

References Cited
UNITED STATES PATENTS

| 876,638 | 1/1908 | Harrington | 43—65 |
| 2,493,100 | 1/1950 | Adams | 43—17.2 |
| 3,123,930 | 3/1964 | Rimar | 43—5 |
| 3,363,355 | 1/1968 | Kellner | 43—5 |

WARNER H. CAMP, Primary Examiner